United States Patent [19]

Masuda

[11] Patent Number: 4,470,011

[45] Date of Patent: Sep. 4, 1984

[54] ELECTRIC TYPE TACHOMETER FOR VEHICLES

[75] Inventor: Yutaka Masuda, Fukuroi, Japan

[73] Assignee: Yamaha Motor Co., Ltd., Iwata, Japan

[21] Appl. No.: 430,047

[22] Filed: Sep. 24, 1982

[30] Foreign Application Priority Data

Sep. 24, 1981 [JP] Japan .................................. 56-150879

[51] Int. Cl.³ .......................... G01P 3/48; G01D 3/54
[52] U.S. Cl. .................................................. 324/166
[58] Field of Search ............... 324/115, 131, 166, 161, 324/163; 377/19

[56] References Cited

U.S. PATENT DOCUMENTS 4,086,532 4/1978 Aronson ............................... 324/166
4,140,970 2/1979 Graziano ............................. 324/166
4,223,297 9/1980 Nomura ........................... 324/166 X
4,329,641 5/1982 Ikeda .................................... 324/115
4,380,733 4/1983 Yano .................................... 324/166

Primary Examiner—Stanley T. Krawczewicz
Assistant Examiner—Jose M. Solis
Attorney, Agent, or Firm—Donald D. Mon; David O'Reilly

[57] ABSTRACT

An electric tachometer having a bar-graph display representing revolutions per minute (r.p.m.) on two scales. One scale shows normal r.p.m. while an expanded scale is provided to more accurately indicate r.p.m. while an expanded scale is provided more accurately to indicate r.p.m. lower than a predetermined value. A detector determines whether engine r.p.m. is above a predetermined value and a selector switch permits selection to normal or an expanded display.

12 Claims, 6 Drawing Figures

ELECTRIC TYPE TACHOMETER FOR VEHICLES

FIELD OF THE INVENTION

The present invention relates to a vehicular tachometer of the electric type for electrically displaying the revolutions per minute of an engine mounted on a vehicle.

BACKGROUND OF THE INVENTION

A conventional tachometer mounted on a vehicle has an imprecise display range because engine r.p.m. varies over a wide range. Further, during idle engine adjustments, it is necessary to accurately set engine r.p.m. at a precise value. However, prior art tachometers have such a poor resolution because of the wide display range that it is difficult to accurately read idling r.p.m.

Moreover, it is difficult for a display device having an analog display, such as an ammeter, to ensure a highly accurate display over all r.p.m. ranges. Therefore, accuracy at low r.p.m. ranges (i.e., idling r.p.m.) is usually sacrificed. Thus, it is difficult to read out idling r.p.m. accurately.

There is also a bar-graph display device which responds to a digital system output in which a number of juxtaposed display segments are sequentially illuminated according to the corresponding r.p.m. If the number of segments were to be increased to enhance resolution, the display control device would become increasingly complicated and even more difficult to read. A further difficulty is that production costs would increase proportionately.

BRIEF DESCRIPTION OF THE INVENTION

The present invention has been conceived in view of the background thus far described. An object of the present invention is to provide an electric vehicular tachometer in which display resolution is a low r.p.m. enhanced. Thus, during vehicle maintenance, engine r.p.m. may be accurately read for idle adjustment or the like. This highly accurate read-out is produced on a bar-graph display device without increasing the number of display segments.

In order to achieve the above-specified object, the present invention provides an electric vehicular tachometer for operating a display device derived from an electric signal indicating engine r.p.m. The tachometer is constructed to detect that vehicular speed (i.e., r.p.m.) is equal to or lower than a predetermined value. A display select switch is provided to select an augmented or expanded scale display when the vehicular speed is equal to or lower than a predetermined value.

DETAILED DESCRIPTION OF THE INVENTION

Figure 1:
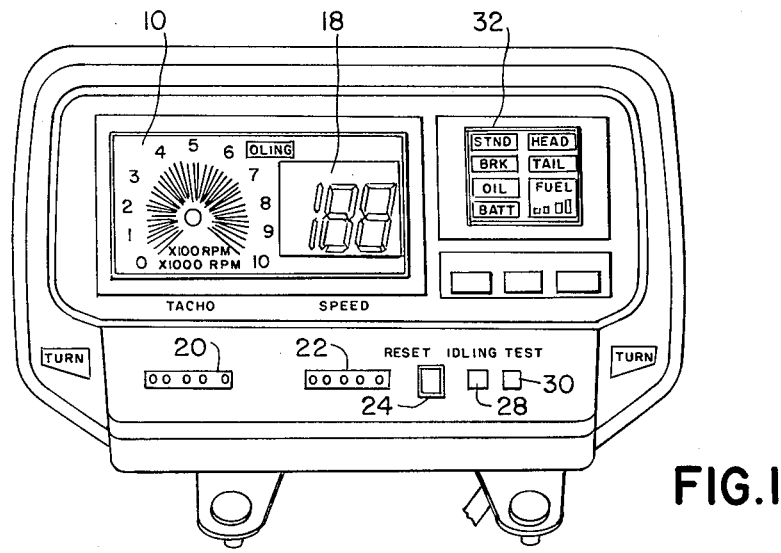
FIG. 1 is a front elevation of a motorcycle meter box to which one embodiment of the present invention is applied.
Figure 2:
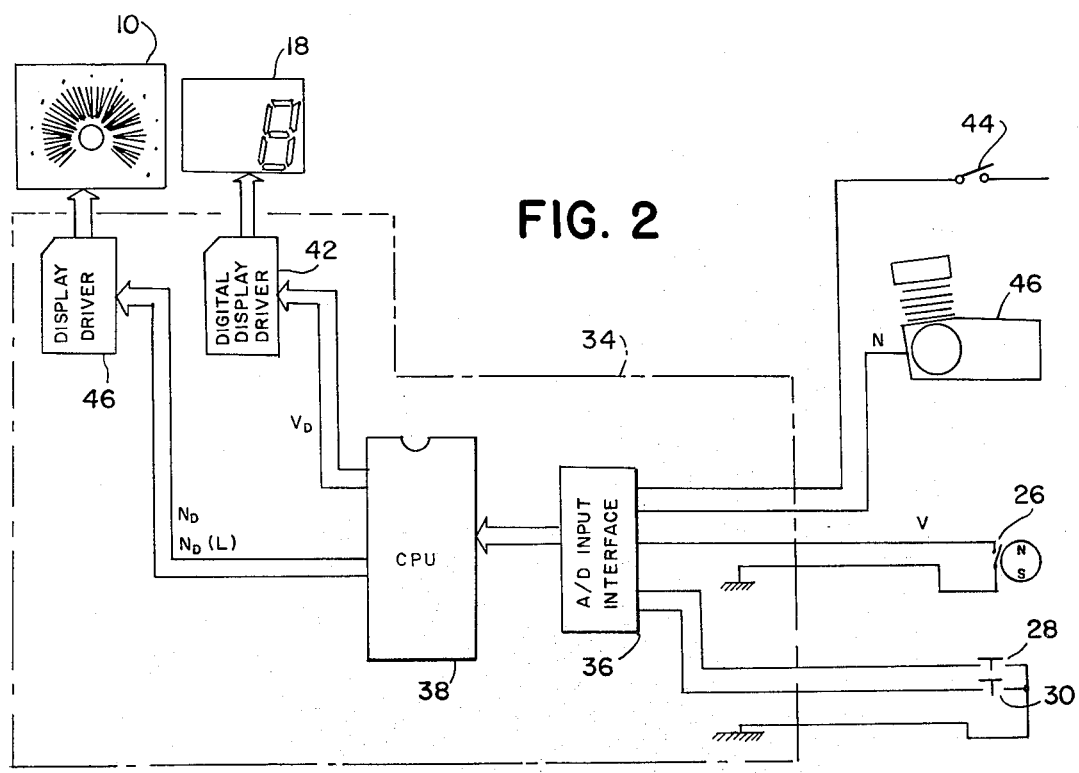
FIG. 2 is a circuit diagram in partial block diagram form showing a portion of the meter box.
Figure 4A:
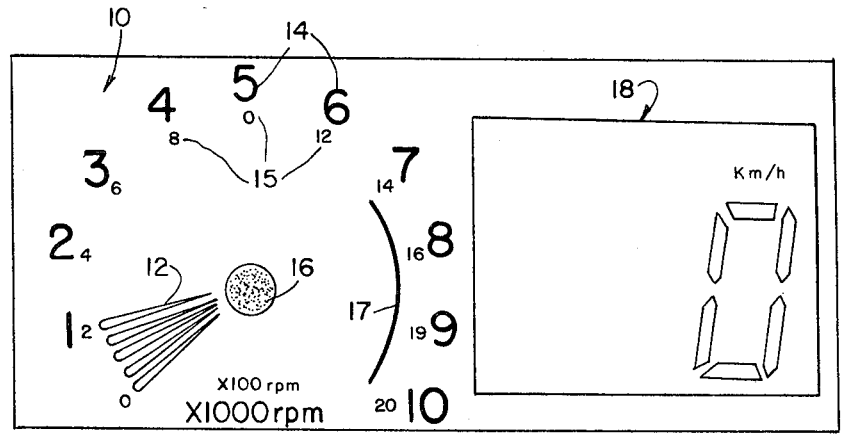
FIGS. 4A and 4B illustrate display modes with FIG. 4A showing a normal scale display and FIG. 4B showing an expanded scale display.

In the embodiment of FIG. 1, engine r.p.m. N is displayed in a bar-graph form by use of a micro-computer. In FIGS. 1 and 4, reference numeral 10 indicates a tachometer having a plurality of display segments 12. The tachometer display 10 has indicia around display segments 12 with the normal scale 14 being in increments of magnification of 1000 and an expanded scale 15 graduated alongside normal scale 14 in increments of magnification of 100. Thus the usual or normal scale provides an r.p.m. reading up to 10,000 and the expanded scale provides an r.p.m. reading up to 2,000. The scales 14 and 15 have a common center mark 16 and an arcuate warning line 17 warning when r.p.m.'s displayed exceed a safety minimum which can be observed at all times. Electronic display elements such as those known as liquid crystal display (LCD) are preferred for the display segments 12. A digital speedometer display device 18 is provided for displaying the running speed V of a vehicle. Odometer 20 and trip meter 22 are the well-known mechanical type in which revolutions of a wheel (not shown) are transmitted through a flexible shaft to gears. A reset button 24 is provided for returning trip meter 22 readings to zero. Vehicular speed B is detected through a proportional electric pulse generated by revolution detector 26 (as shown in FIG. 2). Revolution detector 26 is composed of a rotating magnet fixed to the flexible shaft driving meters 20 and 22 and a switch disposed in the vicinity of the rotary magnet as is known. In FIGS. 1 and 2, in addition to the elements already described, idle switch 28 acts as a display select switch; switch 30 is a test switch; and warning display board 32 is provided for displaying malfunctions of various respective functions of a vehicle.

In FIG. 2, control device, indicated at 34, is comprised of: an input interface 36 comprised of an integrated chip (IC); a programmable digital arithmetic device 38 (commonly referred to as a central processing unit or "CPU") comprised of a single-chip micro computer; a driver 40 comprised of an IC for driving tachometer display device 10; and driver 42 comprised of an IC for driving speedometer display device 18. Input interface 36 is connected to start switch 44 and voltage interruptions at the primary side of an ignition coil (not shown) of engine 46; to revolution detector 26, idle switch 28 and test switch 30. Central processing unit (CPU) operates as shown in FIG. 3 in response to a digital signal generated by input interface IC 36.

When main switch 44 is turned on (FIG. 3, Step 100), input interface 36 feeds CPU 38 with an operation start signal at a predetermined voltage level, and CPU 38 consecutively reads in programs, which are stored in the internal memory thereof, to start the arithmetic operations. Input interface 36 converts pulse signals generated by revolution detector 26 to a square wave having a predetermined voltage and period (i.e., frequency) proportional to the vehicular speed indicated. Interface 36 also converts pulse signals generated by voltage interruptions on the primary side of the ignition coil of engine 46 to a square wave having a predetermined voltage and frequency proportional to the r.p.m. N of the engine 46. CPU 38 calculates vehicular speed V and r.p.m. N in accordance with the frequencies of the respective square waves and feeds drivers 42 and 40, respectively, with binary coded decimal (BCD) signals $V_D$ and $N_D$ corresponding to vehicular speed V and r.p.m. N. The BCD r.p.m. signal $N_D$ initially is a signal for providing a normal display so that tachometer display device 10 has energized both portions corresponding to a normal scale 14 and respective segments 12 (FIG. 3, Step 102). Driver 42 selectively energizes one or more of seven display segments of speedometer display device 18 according to the BCD signal $V_D$ indicating vehicular speed V. Speedometer display device 18 always displays vehicular speed V independently of the operation of tachometer display device 10.

Figure 3:
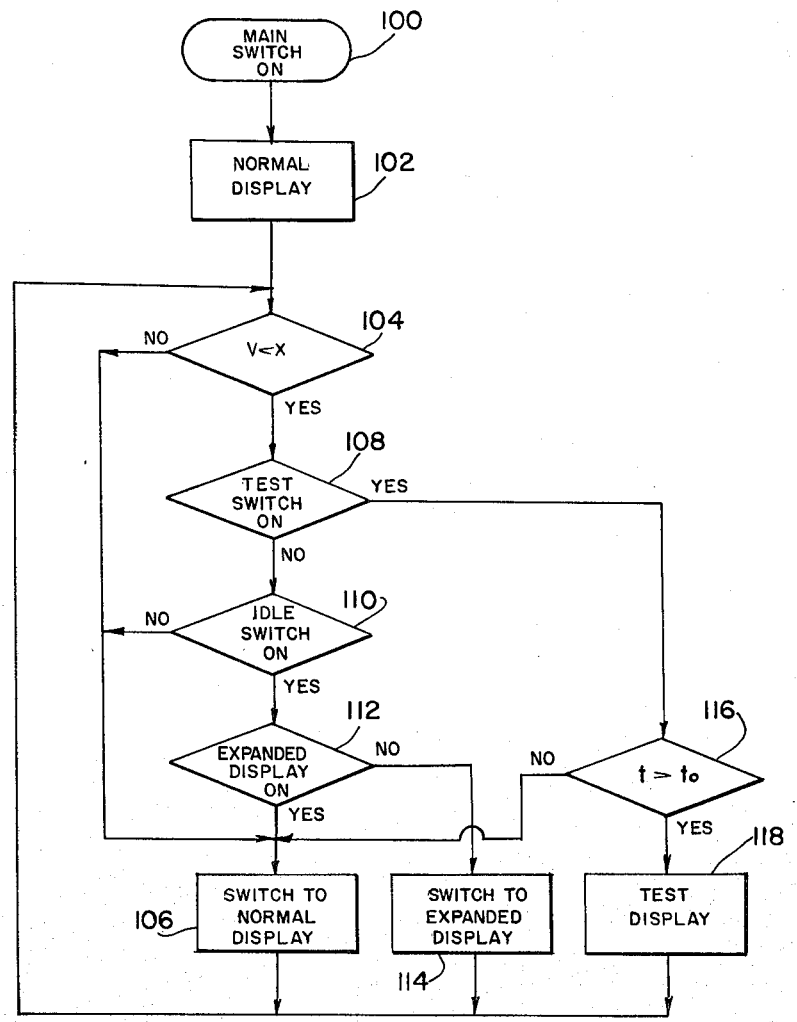
FIG. 3 is a logic diagram.

When main switch 44 is closed (i.e., turned on) as in FIG. 3, Step 100, tachometer display device 10 has a normal display. When the engine is stopped, only the lefthand segment (i.e., last) of display segments 12 of display 10 is on.

Next, CPU 38 compares vehicular speed with a set vehicular speed x stored in advance in the memory (FIG. 2, Step 104). The set vehicular speed x (e.g. 3 Km/h) is used to determine that the vehicle is running, and feeds a tachometer display device 10 with BCD signal $N_D$ for a normal display so that tachometer display 10 provides a normal display (FIG. 3, Step 106).

If the vehicular speed V is not higher than set value x (FIG. 3, Step 104), CPU 38 determines whether test switch 30 is on or not (FIG. 3, Step 108). When on the CPU 38 has determined that the test display is not selected, it then determines whether idle switch 28 is on or not (FIG. 3, Step 110). Incidentally, input interface 36 continues to feed square wave pulses at a predetermined voltage to CPU 38 for a predetermined period (i.e., for a period sufficient for one complete cycle of the steps illustrated in the logic diagram of FIG. 3). If idle switch 28 is off, CPU 39 determines that an expanded display is not selected (FIG. 3, Step 110) and feeds a BCD signal $N_D$ to provide a normal display. As a result, tachometer display 10 provides a normal display (FIG. 3, Step 106).

Figure 4B:
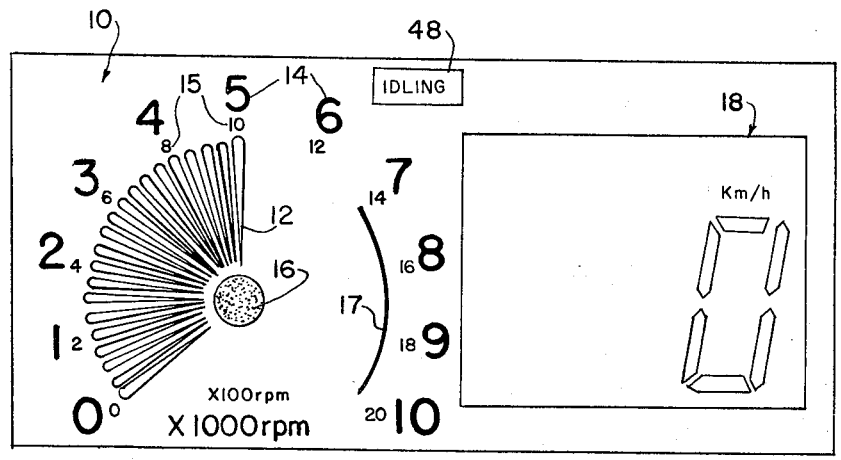

If idle switch 28 is on, CPU 38 determines that an expanded display has been selected (FIG. 3, Step 110), and then determines whether tachometer 10 is displaying an expanded display or not (FIG. 3, Step 112). If it is in the expanded display mode, CPU 38 feeds a BCD signal $N_D$ to switch the display to a normal display (FIG. 3, Step 106). If it is not already in an expanded display, CPU 38 feeds out a BCD signal $N_D$ (L) to switch the display to an expanded scale display so that tachometer 10 indicates an expanded scale display (FIG. 3, Step 114). At this time, more specifically, CPU 38 feeds driver 40 with BCD signal $N_D$(L), derived by reducing the number of frequency divisions (i.e., pulses) of the BCD signal indicative of the r.p.m. N to one fifth as small as in the case of the normal display (i.e., increases the frequency by five), so that five times as many display segments 12 as in a normal display are brought into operation in tachometer display device 10. Thus, there are five times as many segments illuminated for each unit of r.p.m. up to a predetermined maximum r.p.m. That is, the frequency is changed to provide an indication of 40 r.p.m. per segment in an expanded display rather than 200 r.p.m. per segment in a normal display. Incidentally, during expanded scale display, idling display indicator 48 will be activated to indicate an expanded scale display mode has been selected, as shown in FIG. 4(B). Each time the idle switch 28 is turned on (FIG. 3, Step 110), the display is switched from normal scale display to expanded scale display and from expanded scale display to normal scale display in an alternate manner (FIG. 3, Step 112).

If test switch 30 is determined to be on during Step 108, (FIG. 3) input interface 36 generates a predetermined voltage which continues during that "ON" period. CPU 38 measures time duration t for continuation of that "ON" condition and compares time t with a preset time $t_0$ (i.e., for several seconds, FIG. 3, Step 116). For $t > t_0$, CPU 38 activates a series of test displays in accordance with the stored programs (FIG. 3, Step 118). In the test display mode, more specifically, the operator is informed that there are no malfunctions in operation of respective portions by bringing display segments 12 of tachometer display 10 into consecutive operative status from the lefthand end until all segments 12 are in operation. Also, in the test display mode (FIG. 3, Step 118), display 18 of the speedometer is tested. More specifically, the first digit of display device 18 is returned to zero after it has been consecutively changed from zero to nine, and the second digit is then returned to zero after it has been consecutively changed from zero to nine, until the third unit is consecutively displayed at one and two.

If it is determined at Step 116 (FIG. 3) that $t \, t_0$, a normal display is produced (FIG. 3, Step 106). Program Step 116 is designed not to produce a test display when test switch 30 is carelessly turned on.

Once operation of the respective Steps 100 to 118 are completed, they are repeated for a predetermined period, while main switch 44 is on and all operations are stopped when switch 44 is turned off.

Although, in the embodiment thus far described, there are provided respective preprogrammed Steps 108, 116 and 118 for conducting test displays to inform an operator whether the tachometer or the speedometer is malfunctioning, it is apparent that the desired objects of the present invention can be achieved even if those respective steps are omitted. According to the invention, since V x is always determined at Step 104 during running operation, a normal scale display is provided at all times when this condition exists (FIG. 3, Step 106) so that an expanded scale display is absolutely precluded even if switches 28 and 30 are erroneously operated during running operation. The display is automatically switched to a normal display by Step 104, even if the vehicle is started with an expanded scale display selected by switch 28 so that the tachometer scale is not erroneously read.

Although the foregoing embodiment is constructed with a digital circuit, the present invention can also be constructed with an analog circuit.

Figure 5:
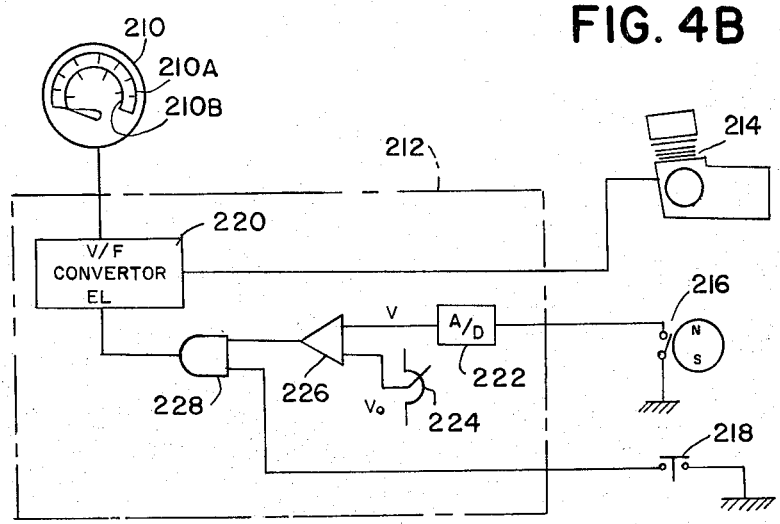
FIG. 5 is a diagram showing an alternate embodiment of the invention.

FIG. 5 is a view showing the overall construction of another embodiment having an analog circuit. This embodiment uses an analog display device composed of an ammeter 210 for displaying the effective r.p.m. ranges. Ammeter 210 is marked when both a normal scale 210A for showing a normal display juxtaposed next to an expanded scale 210B for an expanded display. Reference numerals 212, 214, 216 and 218 indicate a controller, an engine, a speedometer and a display selecting switch, respectively. Controller 212 is equipped with a main circuit which is receptive to an electric signal indicative of the r.p.m. of an engine 214. The r.p.m. of engine 214, for example, is detected in terms of an electric signal from the current or voltage interruptions at the primary side of the engine ignition coil. Main circuit 220 generates effective current proportional to the frequency of either current interruptions or voltage interruptions, for example, a monostable multivibrator or a capacitor charging or discharging circuit. The effective current generated by main circuit 220 is selected so that the maximum scale of display 210 on ammeter 210, acting as the aforementioned display device, is selected to indicate the maximum range of r.p.m. of the engine 214. As a result, during normal display, the r.p.m. is displayed on scale 210A over its entire range.

Main circuit 220 is also equipped with an expanded display terminal EL and a current amplifier (not shown) so that it amplifies the effective current in the current amplifier at a predetermined amplification factor if terminal EL receives a predetermined electric signal. As a result, the operation of ammeter 210 is augmented to initiate an expanded scale display mode, whereby the r.p.m. is read out on expanded scale 210B.

A DA (i.e., digital to analog) converter 222, a speed setter 224, a comparator 226 and an AND circuit 228 are shown respectively in FIG. 5. Speed detector 216 generates signal pulses having a frequency porportional to vehicular speed V similar to the aforementioned embodiment, whereas DA converter 222 generates a voltage v proportional to that frequency. Comparator 226 compares the output voltage v of DA converter 222 and the voltage $v_0$ which is set by the speed setter 224 so that it generates a logic "1" only for $v > v_0$. Incidentally, voltage $v_0$ is set as a voltage corrersponding to the set vehicular speed, e.g., 2 Km/h. AND circuit 228 feeds terminal EL of main circuit 220 with a signal indicating an expanded display on the basis of both an output of logic "1" from comparator 226 and an "ON" signal (i.e., logic "1") from display select switch 218 to select an expanded display. As a result, main circuit 220 makes ammeter 210 provide an expanded display.

As has been described hereinbefore, according to the present invention, the display scale is expanded for modes when vehicle speed is equal to or lower than a set value or in which a display select switch selects an expanded display so that idling r.p.m. can be accurately and precisely read. In the case of a bar-graph display responding to a digital system the resolution can be enhanced without increasing the number of display segments. Further, a device according to the prior art can be used substantially as it is by merely changing the arithmetic programs in a microprocessor. As a result, there is no substantial rise in production costs. Further, since it is unnecessary to increase the number of display segments, there is no difficulty in reading a normal display. During running operation, at a speed faster than a preset vehicular speed, a normal display is always provided. Furthermore, even if the engine is started with the display select switch selecting an expanded display, a normal display is automatically provided to prevent an erroneous read out.

I claim:

1. An electric tachometer device comprising; signal generating means for generating a signal having a voltage and frequency proportional to an engine's r.p.m.; said generating means being connected to receive voltage pulses from said engine; signal processing means receiving the output signal from said signal generating means and generating a binary coded decimal signal representing said engine r.p.m.; display means for displaying the output of said processing means; said display means comprising a plurality of sequentially illuminated segments; drive means receiving the binary coded output of said processing means for driving said display means; display select means for selecting a normal scale display or an expanded scale display; said display select means changing the display scale by increasing or decreasing the number of segments to be illuminated per unit of r.p.m.

2. The device according to claim 1 in which said signal generating means generates a square wave.

3. The device according to claim 2 in which said display select means changes a first frequency of said signal from said signal generating means to a frequency which is a predetermined multiple of said first frequency.

4. The device according to claim 3 in which said display select means changes the frequency by a multiple of five.

5. The device according to claim 4 in which said display is a liquid crystal display.

6. The device according to claim 5 in which each segment of said liquid crystal display indicates 200 r.p.m. in normal scale display and 40 r.p.m. in expanded scale display.

7. The device according to claim 1 including detecting means for detecting and generating an electric signal proportional to vehicle speed, said signal generating means receiving the output from said detecting means and generating a signal having a voltage and frequency proportional to vehicular speed; and second display means for displaying said vehicular speed.

8. The device according to claim 7 in which said processing means receives the output from said signal generating means and generates a digital signal, said second display means comprising a digital display to indicate vehicle speed.

9. The device according to claim 8 in which said detecting means comprises a revolution detector.

10. The device according to claim 9 in which said processing means comprises a programmable microprocessor.

11. The device according to claim 10 in which said microprocessor is programmed to switch said display from a normal display to an expanded display or vice versa, depending upon the position of said display select means.

12. The device according to claim 11 including a test switch for testing the display, said programmable microprocessor being programmed sequentially to test said display means if said test switch is energized for a predetermined minimum period of time.

* * * * *